US010169331B2

(12) United States Patent
Baron-Palucka et al.

(10) Patent No.: US 10,169,331 B2
(45) Date of Patent: Jan. 1, 2019

(54) TEXT MINING FOR AUTOMATICALLY DETERMINING SEMANTIC RELATEDNESS

(71) Applicant: International Business Machines Corporation, Armonk, NY (US)

(72) Inventors: Kamila Baron-Palucka, Cracow (PL); Lukasz G. Cmielowski, Cracow (PL); Marek J. Oszajec, Debica (PL); Pawel Slowikowski, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 15/418,744

(22) Filed: Jan. 29, 2017

(65) Prior Publication Data

US 2018/0217980 A1    Aug. 2, 2018

(51) Int. Cl.
*G06F 17/27* (2006.01)
*H04L 12/58* (2006.01)
*H04L 29/06* (2006.01)

(52) U.S. Cl.
CPC ........ *G06F 17/2785* (2013.01); *G06F 17/277* (2013.01); *G06F 17/278* (2013.01);
(Continued)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS

| 6,598,047 B1 * | 7/2003 | Russell | G06F 17/3061 |
| 6,615,208 B1 * | 9/2003 | Behrens | G06F 17/3069 707/754 |

(Continued)

OTHER PUBLICATIONS

Dina Said, et al., Clustering Posts in Online Discussion Forum Threads, International Journal of Computer Science & Information Technology, Apr. 2011, pp. 1-14, vol. 3., No. 2, AIRCC Publishing Corporation, Published at: http://airccse.org/journal/jcsit/0411csit01.pdf.

(Continued)

*Primary Examiner* — Lamont M Spooner
(74) *Attorney, Agent, or Firm* — Lee Law, PLLC; Christopher B. Lee

(57) ABSTRACT

Described herein is an approach for automatically determining the semantic relatedness of documents to semantic concepts. A first text mining analysis extracts a set of reference concepts from reference documents. A second text mining analysis extracts a set of test concepts from test documents that include a mixture of new concepts and reference concepts. An extended co-occurrence matrix is computed that indicates a frequency of co-occurrence (RCCF) of each new and each reference concept in the test documents with all other new and reference concepts. The extended co-occurrence matrix is used for computing a new concept relatedness score (NCRS) for the new concepts. A document similarity score (DSS) is computed for each of the test documents by aggregating, inter alia, the NCRS of each new concept with the RCCF of each reference concept. The DSS represents the semantic relatedness of the test document to the totality of the reference concepts.

17 Claims, 6 Drawing Sheets

(52) U.S. Cl.
CPC .......... *G06F 17/2795* (2013.01); *H04L 51/32* (2013.01); *H04L 67/42* (2013.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795
USPC ............................ 704/1, 9, 10; 707/706–708
See application file for complete search history.

(56) References Cited

U.S. PATENT DOCUMENTS

| | | | | |
|---|---|---|---|---|
| 7,392,175 | B2* | 6/2008 | Kawatani | ...................... 704/257 |
| 7,702,618 | B1* | 4/2010 | Patterson | ............ G06F 17/2288 |
| | | | | 707/999.003 |
| 8,255,786 | B1* | 8/2012 | Gattani | ............. G06F 17/30014 |
| | | | | 715/205 |
| 8,312,034 | B2* | 11/2012 | Hagar | ............... G06F 17/30864 |
| | | | | 707/765 |
| 9,355,172 | B2 | 5/2016 | Howes et al. | |
| 2002/0103799 | A1* | 8/2002 | Bradford | ........... G06F 17/30687 |
| 2004/0064438 | A1* | 4/2004 | Kostoff | ............. G06F 17/30705 |
| 2004/0093557 | A1* | 5/2004 | Kawatani | ...................... 715/255 |
| 2004/0220944 | A1* | 11/2004 | Behrens | .............. G06F 17/3071 |
| 2005/0149494 | A1* | 7/2005 | Lindh | ............... G06F 17/30607 |
| 2005/0154690 | A1* | 7/2005 | Nitta | .................... G06F 17/2217 |
| | | | | 706/46 |
| 2005/0216443 | A1* | 9/2005 | Morton | ............... G06F 17/3002 |
| 2006/0106792 | A1* | 5/2006 | Patterson | .......... G06F 17/30616 |
| 2007/0214137 | A1* | 9/2007 | Gloor | ................ G06F 17/30716 |
| 2008/0077570 | A1* | 3/2008 | Tang | ................. G06F 17/30684 |
| 2008/0306943 | A1* | 12/2008 | Patterson | .......... G06F 17/30864 |
| 2009/0094232 | A1 | 4/2009 | Marvit et al. | |
| 2010/0223671 | A1* | 9/2010 | Tsuda | .................... G06F 21/554 |
| | | | | 726/26 |
| 2012/0109964 | A1* | 5/2012 | Jiang | ................. G06F 17/30038 |
| | | | | 707/739 |
| 2012/0259855 | A1* | 10/2012 | Mizuguchi | .......... G06F 17/3071 |
| | | | | 707/739 |
| 2013/0013603 | A1* | 1/2013 | Parker | ............... G06F 17/30707 |
| | | | | 707/737 |
| 2013/0138696 | A1* | 5/2013 | Turdakov | .......... G06F 17/30734 |
| | | | | 707/794 |
| 2013/0158986 | A1* | 6/2013 | Wiles | .................... G06F 17/279 |
| | | | | 704/9 |
| 2013/0173257 | A1* | 7/2013 | Rose | ..................... G06F 17/277 |
| | | | | 704/9 |
| 2014/0040297 | A1 | 2/2014 | Ozonat et al. | |
| 2015/0081657 | A1* | 3/2015 | Yi | ..................... G06F 17/30672 |
| | | | | 707/706 |
| 2015/0161144 | A1* | 6/2015 | Goto | ................... G06F 17/3071 |
| | | | | 707/739 |
| 2016/0103885 | A1* | 4/2016 | Lee | .................. G06F 17/30539 |
| | | | | 707/739 |
| 2016/0103920 | A1* | 4/2016 | Lee | .................. G06F 17/30867 |
| | | | | 707/706 |

OTHER PUBLICATIONS

David Ramamonjisoa, Topic Modeling on Users's Comments, In proceedings of the 2014 Third ICT International Student Project Conference, Mar. 2014, pp. 1-4, IEEE Society, Published at: 1. http://www.ispc.ict.mahidol.ac.th/documents/ICT-ISPC2014%20Proceeding/data/ISPC2014_16.pdf.

* cited by examiner

Reference Documents (SocialNetwork_1) — 102

| FBPost | Content |
|---|---|
| F1 | RT@SC_en: Hope that campers experience Great Games at Summer Camp #SC #Campville2016 https://<t.camp> |
| F2 | #SCCampville2016, it's a great day to go to Summer Camp Campville2016 as a camper https://<t.camp>WysLTaizYF |
| F3 | Great final day of prep for @SC_en with all the @DoneDino camper #1MonthToGo #Campville2016 #SC https://<t.camp>FnFVB50Q9j |

Extracted Ref. Concepts (SocialNetwork_1) — 104

| C1 | campers |
|---|---|
| C2 | Summer Camp |
| C3 | #Campville2016 |
| C4 | camper |
| C5 | great day |

Grouped Ref. Concepts (SocialNetwork_1) — 106

| GC1 | campers | ← C1+C4 |
|---|---|---|
| GC2 | Summer Camp | |
| GC3 | #Campville2016 | |
| GC4 | great day | |

Fig. 1

Co-occurrence Matrix (SocialNetwork_1) — 202

|  | GC1 | GC2 | GC3 | GC4 |
|---|---|---|---|---|
| GC1 | 0 | 2 | 2 | 1 |
| GC2 | 2 | 0 | 1 | 1 |
| GC3 | 2 | 1 | 0 | 0 |
| GC4 | 3 | 1 | 0 | 0 |

Fig. 2

Matching Data of other Social Media (SocialNetwork_2) — 302

| Tweet | Content |
|---|---|
| T1 ○ | I want to become a camper and visit #Campville2016 |
| T2 ☐ | What a *great day* for joining a gym |
| T3 ○ | I'm part of #Campville2016, the camping experience is amazing |
| T4 ☐ | We opened a new bookstore – visit us |
| T5 ○ | Mentor in the camping experience |

|  | Grouped Test Concepts (SocialNetwork_2) |
|---|---|
| GC1 | campers |
| GC3 | #Campville2016 |
| GC4 | great day |
| GC5 | a gym |
| GC6 | camping experience |
| GC7 | new bookstore |
| GC8 | Mentor |

306

Legend

○   Tweet related topic, Campville2016*

☐   Tweet not related to topic, Campville 2016* text   Known (reference) concepts (in SocialNetwork_1, optionally in SocialNetwork_2)

text   New concepts (in SocialNetwork_2, not in SociaNetwork_1)

Fig. 3

Co-occurrence Matrix (SocialNetwork_2)                402

|     | GC1 | GC3 | GC4 | GC5 | GC6 | GC7 | GC8 |
|-----|-----|-----|-----|-----|-----|-----|-----|
| GC1 | 0   | 1   | 0   | 0   | 0   | 0   | 0   |
| GC3 | 1   | 0   | 0   | 0   | 1   | 0   | 0   |
| GC4 | 0   | 0   | 0   | 1   | 0   | 0   | 0   |
| GC5 | 0   | 0   | 1   | 0   | 0   | 0   | 0   |
| GC6 | 0   | 1   | 0   | 0   | 0   | 0   | 1   |
| GC7 | 0   | 0   | 0   | 0   | 0   | 0   | 0   |
| GC8 | 0   | 0   | 0   | 0   | 1   | 0   | 0   |

Fig. 4

Co-occurrence Matrix (SocialNetwork_1) — 202

|     | GC1 | GC2 | GC3 | GC4 |
|-----|-----|-----|-----|-----|
| GC1 | 0   | 100 | 98  | 15  |
| GC2 | 100 | 0   | 99  | 10  |
| GC3 | 98  | 99  | 0   | 0   |
| GC4 | 15  | 10  | 0   | 0   |

Fig. 5a

Co-occurrence Matrix (SocialNetwork_2) — 402

|     | GC1 | GC3 | GC4 | GC5 | GC6 | GC7 | GC8 |
|-----|-----|-----|-----|-----|-----|-----|-----|
| GC1 | 0   | 80  | 0   | 0   | 0   | 0   | 0   |
| GC3 | 80  | 0   | 0   | 0   | 20  | 0   | 0   |
| GC4 | 0   | 0   | 0   | 5   | 0   | 0   | 0   |
| GC5 | 0   | 0   | 5   | 0   | 0   | 0   | 0   |
| GC6 | 0   | 20  | 0   | 0   | 0   | 0   | 35  |
| GC7 | 0   | 0   | 0   | 0   | 0   | 0   | 0   |
| GC8 | 0   | 0   | 0   | 0   | 35  | 0   | 0   |

Fig. 5b

Co-occurrence Matrix (SocialNetwork_1) with Reference Co-occurrence Frequencies (RCCF)

sum of #occurrences in row — 402

|     | GC1 | GC2 | GC3 | GC4 | RCCF |
|-----|-----|-----|-----|-----|------|
| GC1 | 0   | 100 | 98  | 15  | 213  |
| GC2 | 100 | 0   | 99  | 10  | 209  |
| GC3 | 98  | 99  | 0   | 0   | 197  |
| GC4 | 15  | 10  | 0   | 0   | 25   |

$AVGRCCF_{socialnetwork\_1} = 161$

Fig. 6

Extended Co-occurrence Matrix (SocialNetwork_2)

|     | GC1 | GC2 | GC3 | GC4 | GC5 | GC6 | GC7 | GC8 |
|-----|-----|-----|-----|-----|-----|-----|-----|-----|
| GC1 | 0   | 0   | 80  | 0   | 0   | 0   | 0   | 0   |
| GC2 | 0   | 0   | 0   | 0   | 0   | 0   | 0   | 0   |
| GC3 | 80  | 0   | 0   | 0   | 0   | 20  | 0   | 0   |
| GC4 | 0   | 0   | 0   | 0   | 5   | 0   | 0   | 0   |
| GC5 | 0   | 0   | 0   | 5   | 0   | 0   | 0   | 0   |
| GC6 | 0   | 0   | 20  | 0   | 0   | 0   | 0   | 35  |
| GC7 | 0   | 0   | 0   | 0   | 0   | 0   | 0   | 0   |
| GC8 | 0   | 0   | 0   | 0   | 0   | 35  | 0   | 0   |

Fig. 7

Extended Co-occurrence Matrix (SocialNetwork_2) with Reference Co-occurrence Frequencies (RCCFs) and New Concept Relatedness Scores (NCRS)

|     | GC1 | GC2 | GC3 | GC4 | GC5 | GC6 | GC7 | GC8 | CCFs        |      |
|-----|-----|-----|-----|-----|-----|-----|-----|-----|-------------|------|
| GC1 | 0   | 0   | 80  | 0   | 0   | 0   | 0   | 0   | 213         | RCCF |
| GC2 | 0   | 0   | 0   | 0   | 0   | 0   | 0   | 0   | 209         | RCCF |
| GC3 | 80  | 0   | 0   | 0   | 0   | 20  | 0   | 0   | 197         | RCCF |
| GC4 | 0   | 0   | 0   | 0   | 5   | 0   | 0   | 0   | 25          | RCCF |
| GC5 | 0   | 0   | 0   | 5   | 0   | 0   | 0   | 0   | 0,776397516 | NCRS |
| GC6 | 0   | 0   | 20  | 0   | 0   | 0   | 0   | 35  | 24,47204969 | NCRS |
| GC7 | 0   | 0   | 0   | 0   | 0   | 0   | 0   | 0   | 0           | NCRS |
| GC8 | 0   | 0   | 0   | 0   | 0   | 35  | 0   | 0   | 2,660005401 | NCRS |

Fig. 8

Compute Document Similarity Score (DSS) for each SocialNetwork_2 Post

302'

| Tweet | Content | DSS |
|---|---|---|
| T1 | I want to become a camper and visit #Campville2016 | 213+197=410 |
| T2 | What a *great day* for joining a gym | 25,77764 |
| T3 | I'm part of #Campville2016, the camping experience is amazing | 221,472 |
| T4 | We opened a new bookstore – visit us | 0 |
| T5 | Mentor in the camping experience | 27,13206 |

TEXT MINING FOR AUTOMATICALLY DETERMINING SEMANTIC RELATEDNESS

BACKGROUND

The present invention relates to the field of data analysis and more specifically, to using text mining for automatically determining semantic relatedness.

Conventional computers are good at manipulating structured data, i.e., data that is organized in a particular way as to allow specialized data processing and parsing routines to efficiently analyze and interpret the data. Numbers of a predefined length that may be stored in a relational database represent examples of structured data.

SUMMARY

A computer-implemented method includes: by a text mining server that autonomously determines semantic relatedness of a plurality of semantic concepts: establishing a network connection to one or more social networking platform servers; identifying, by programmatically navigating at least one application programming interface (API) of at least one social networking application hosted the one or more social networking platform servers, multiple reference documents and multiple test documents published by the one or more social networking platform servers; applying a first text mining analysis on the reference documents and extracting a non-redundant set of reference concepts from the reference documents; for each reference concept of the set of reference concepts, computing a reference co-occurrence frequency (RCCF), the RCCF indicating the frequency of co-occurrence of the reference concept with all other reference concepts within the reference documents; applying a second text mining analysis on the test documents and extracting a non-redundant set of test concepts, the test concepts including one or more new concepts that are not elements of the set of reference concepts and the test concepts including one or more of the reference concepts; computing an extended co-occurrence matrix indicating the frequency of co-occurrence of each new concept and each reference concept with all other new and reference concepts of a totality of the new concepts and reference concepts within the test documents; for each of the new concepts, computing a new concept relatedness score (NCRS) as a function of the co-occurrences of the new concept in the extended co-occurrence matrix, the NCRS representing the semantic relatedness of the new concept to the totality of the reference concepts; and for each of the test documents, computing a document similarity score (DSS) by aggregating the NCRS of each new concept and the RCCF of each reference concept contained in the test document, the DSS representing the semantic relatedness of the test document to the totality of the reference concepts.

A system that performs the computer-implemented method and a computer program product that cause a computer to perform the computer-implemented method are also described.

BRIEF DESCRIPTION OF THE DRAWINGS

FIG. 1 is a diagram of an example of an extraction of reference concepts from reference documents;

FIG. 2 is a diagram of an example of a co-occurrence matrix computed for the reference concepts shown as extracted in FIG. 1;

FIG. 3 is a diagram of an example of an extraction of test concepts from test documents;

FIG. 4 is a diagram of an example of a co-occurrence matrix computed for the test concepts and the reference concepts that also occur in the test documents shown as extracted in FIG. 3;

FIG. 5a is a diagram of an example of the co-occurrence matrix of the reference concepts of FIG. 2 populated with "realistic" data;

FIG. 5b is a diagram of an example of the co-occurrence matrix of the test concepts of FIG. 4 populated with "realistic" data;

FIG. 6 is a diagram of an example of the co-occurrence matrix of FIG. 5a with computed reference co-occurrence frequencies (RCCFs);

FIG. 7 is a diagram of an example of an extended co-occurrence matrix derived from FIG. 5b;

FIG. 8 is a diagram of an example of the extended co-occurrence matrix of FIG. 7 with computed new concept relatedness scores (NCRSs);

DETAILED DESCRIPTION

Figures 9, 10:
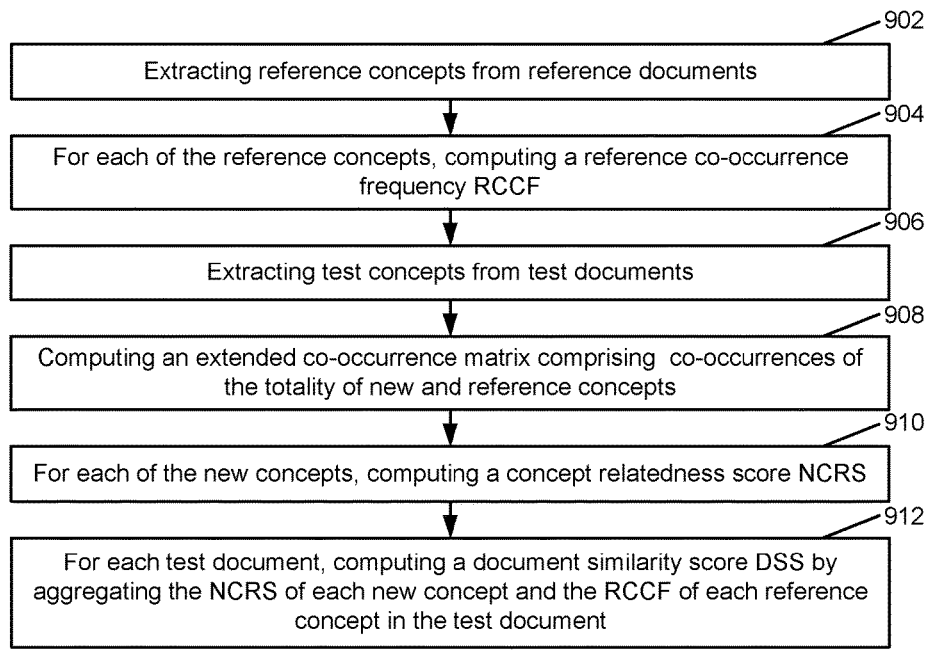
FIG. 9 is a diagram of example test documents and their respective computed document similarity scores (DSSs)
FIG. 10 is a flow chart of an example of an implementation of a method for identifying semantic similarity between documents.

Embodiments of the invention provide an automated and highly accurate method of determining the semantic relatedness of a particular document to one or more reference concepts (and reference documents involving those references concepts). The method may provide high accuracy for comparatively small texts of less than 400 characters, such as Twitter® postings (e.g., tweets) or short chat postings.

It should be noted that conception of the present subject matter resulted from recognition of certain limitations associated with conventional data processing that do not account for the complexities of "big data" processing. For example, from Blogs, Facebook®, tweets, emails, chat rooms, and other social media platforms—data is flooding into every aspect of life. It was observed that, while conventional computers a good at manipulating structured data, a particularly challenging aspect of the "big data" revolution is the processing and automated interpretation of unstructured data, such as text. Unstructured data are things like text (e.g., from social media postings like tweets), or video, or a voice recording. It is generally estimated that structured data represents only twenty percent (20%) of the information available to an organization. That means that eighty percent (80%) of all the data is in unstructured form. Automatically extracting meaning from unstructured text data represents the next Big Data challenge. Tweets and other forms of user generated, largely unstructured social media content, may be characterized by a huge variability of semantically equivalent but syntactically different expressions, and by a huge variability of terminology and language styles. It was also observed that users are typically not only free in how they write text about a particular topic, but are also free to write about topics that are only weakly related or even completely unrelated to an initially discussed topic or set of topics. It was further observed that a growing number of automated "bot-generated" and user-generated postings that do not address the currently discussed topic(s) ("off-topic postings") are being posted on social media platforms, and that these off-topic postings constitute a big challenge for users as well as providers of social media platforms. For example, it was observed that many users post messages merely for promoting goods or services rather than for actively and constructively contributing in the relevant discussion. It was observed that other users may even want to actively destroy forum discussions for personal or economic reasons by posting irrelevant, off-topic messages that pollute the current thread of discussion. It was determined from these several observations that operators of public social media platforms may benefit from being able to efficiently identify and filter out off-topic postings to prevent the platform from being flooded with spam and advertising postings that may make the platform unattractive for its intended users. However, it was also determined that due to the huge amount of postings, manual identification and removal of off-topic postings is not an option because humans are not capable of processing data on this type of "big data" scale. It was further determined that, while automated systems for interpreting social media postings may exist, these approaches require the postings to be ordered, e.g., in the form of a thread of postings, and will not work for un-ordered and unstructured social media postings or social media postings that lack tags or that are very short. The present subject matter improves processing of unstructured data across very large social media platforms, as described above and in more detail below. As such, improved text mining for automated determinations of semantic relatedness of data, such as unstructured data, may be obtained through use of the present technology.

In a further beneficial aspect of the technology described herein, any kind of text-based social media document may successfully be analyzed and interpreted as described above and in more detail below, even where the social media text lacks any tags and/or is unsorted and/or does not include a "head" posting as in forum threads.

In a further advantageous aspect of the technology described herein, embodiments of the invention may allow reliable use of manually curated social media postings as the reference documents for extracting "typical" co-occurrence patterns for the reference concepts discussed therein, and may extend and use the co-occurrence patterns by determining co-occurrence patterns of new and reference concepts in test documents of another, uncurated social media platform. Thus, a highly granular method of extracting the semantic relatedness may be provided, as large social media platforms such as Facebook® cover almost every topic, and thus allow the extraction and analysis of a set of reference documents for almost any topic.

For example, Facebook® fan pages are typically moderated by one or more administrators that eliminate offensive postings or postings that are completely unrelated to the relevant topics of the Facebook® page from the page. Other social media platforms, e.g. Twitter®, are less moderated. For a given hash tag, any user may post his or her comment, and there typically does not exist an administrator that is responsible to monitor and filter the Twitter® postings for a particular hash tag. Thus, Facebook® may be considered a "high quality," "curated" document set (i.e., the reference document set). Twitter® or another un-moderated social media platform may be considered a "low quality," "uncurated" social media platform because typically a larger fraction of postings in Twitter® are off-topic postings.

According to embodiments of the subject matter described herein, a processing flow of the computation of the reference co-occurrence frequencies (RCCFs) for the reference concepts includes, for each reference concept RCi:

counting the number of co-occurrences RCi-RCj of the reference concept RCi with each other one RCj of the reference concepts within the set of reference documents; and computing RCCFi of the reference concept RCi as the sum of all the computed co-occurrences according to RCCFi=$\Sigma_{j=1}^{nr}$(#coocc(RCi-RCj)), wherein nr is the number of reference concepts in the non-redundant set of reference concepts and #coocc(RCi-RCj) is the number of co-occurrences of reference concept RCi and reference concept RCj observed in the reference documents, j being an integer in the range of 1 to nr. Thus, RCCFi is computed by aggregating the number of co-occurrences of RCi-RC1, RCi-RC2, . . . , RCi-RCnr.

This technical feature may be advantageous as the co-occurrence frequencies of all the reference concepts with each other may be computed. The co-occurrence frequencies may be computed comparatively quickly relative to conventional technologies. For example, the co-occurrence frequencies may be computed without performing a conventional computational expensive semantic role labeling step and without performing a conventional complex syntax parser that identifies the subject predicate object structure of the sentence. Thus, the semantic relatedness of documents may be assessed without actually extracting the meaning of individual sentences. This may significantly improve performance of the computing platform and further reduce central processing unit (CPU) consumption. As such, improved computer platform/processor performance may be achieved through use of the technology described herein.

According to embodiments of the subject matter described herein, a processing flow of the computation of the new concept relatedness score (NCRS) for the new concepts includes:

computing the average AVGRCCF of all RCCFs computed for the reference concepts according to $$AVGRCCF = \frac{\sum_{z=1}^{nr} RCCF_z}{nr},$$

nr being the total number of reference concepts in the non-redundant set of reference documents; z is an integer in the range of 1 to nr, for each new concept NCj co-occurring at least once with at least one of the reference concepts in at least one of the test documents:

for each pair of the new concept NCj and one other concept OCp, the other concept being a reference concept occurring at least once in at least one of the test documents, p being an integer between 1 and the total number of reference concepts occurring at least once in at least one of the test documents:

computing an intermediate value IMjp according to:

$$IMjp = \frac{\#[NCj - OCp] * RCCFp}{AVGRCCF * PF},$$

wherein #[NCj-OCp] is the number of co-occurrences of the concept pair NCj-OCp in the extended co-occurrence matrix, PF being a penalty factor, the penalty factor being one or a number larger than one, RCCFp being the RCCF value computed for the other concept from the reference documents; for example, in case in total 22 new concepts were identified in the test documents, 40 reference concepts were identified in the reference documents, and 7 of the 22 new concepts would co-occur with one or more of the 40 reference concepts, 7 intermediate values would be computed;

computing the new concept relatedness score NCRSj for the new concept by aggregating all intermediate values IMjp computed for the new concept N.

Thus, in a case where, in total, twenty two (22) new concepts were identified in the test documents, twenty two (22) new concept relatedness scores (e.g., NCRS1, NCRS2, . . . , NCRS22) would be computed. The above described computations of NCRSs for pairs of new and reference concepts are based on direct co-occurrences of new concepts with the "known" reference concepts, and thus are performed for a "first level" of co-occurrence. For computing the "direct"/"first level of" co-occurrence, preferentially a penalty factor (PF) of one ("1") is used.

These technical features may be advantageous because the relatedness scores of concepts known already from the reference documents is not re-computed based on the test document occurrences. This would decrease the reliability due to the inferior quality of the test documents. Rather, the NCRS is computed selectively for the new concepts, and even the computation of the NCRS makes use of information that is derived from reference concept co-occurrence frequencies. The average co-occurrence frequency (AVGRCCF) and an optional penalty factor (the factor may be "1" and thus is optional) does not depend from the occurrence of reference or new concepts in the test documents. Thus, the intermediate values are corrected by an average occurrence frequency value computed from a high-quality document source and may thus be more reliable, and thereby also improve computational processing speed of the computing platform/processor.

According to embodiments of the subject matter described herein, a processing flow of the computation of the NCRS for the new concepts further includes, after having computed the NCRSs for all new concepts occurring at least once with at least one of the reference concepts in at least one of the test documents:

for each new concept NCk co-occurring solely with other new concepts (not with a reference concept) in the test documents, identifying all pairs of the new concept NCk and one other new concept NCj, the other concept being a new concept for which a new concept relatedness score NCRSj was already computed;

for each of the pairs, computing an intermediate value IMkj according to:

$$IMkj = \frac{\#[NCk - NCj] * NCRSj}{AVGRCCF * PF},$$

wherein #[NCk-NCj] is the number of co-occurrences of the concept pair NCk-NCj in the extended co-occurrence matrix, PF being a penalty factor, the penalty factor being one or a number larger than one, and NCRSj being the NCRS value computed already for the new concept NCj;

computing the concept relatedness score NCRSk for the new concept by aggregating all intermediate values IMkj computed for the new concept NCk.

Co-occurrence may be direct ("first level") or indirect ("second level"). The computation of NCRS values for the "first level" was already described above, and corresponds to the computation of NCRS values for pairs of new and reference concepts co-occurring in the test documents. However, the first level co-occurrence information may miss relevant relatedness information that is hidden in indirect co-occurrences (i.e., in the co-occurrence of a new concept with another new concept), whereby the other new concept has been observed to co-occur with one of the reference concepts in the test documents.

By making reference to the above example, where, in total, twenty two (22) new concepts may have been identified in the test documents, forty (40) reference concepts may have been identified in the reference documents, and seven (7) of the twenty two (22) new concepts may have been observed to co-occur with one or more of the forty (40) reference concepts. In this case, seven (7) intermediate values are computed for the seven (7) new concepts. An eighth ("8th") one of the twenty two (22) new concepts may not co-occur with any reference concept in the test document, but may be observed to co-occur with one or more of the seven (7) new concepts. In that case, an NCRS is computed for this eighth ("8th") new concept, thereby using a penalty factor that is larger than one (1) (e.g., two (2)). Thus, the NCRS computed for new concepts of the "second level" of co-occurrence is lower than that of the new concepts of the "first level", but is considered in the programmatic processing and may contribute to the overall relatedness of a document that includes the eighth ("8th") new concept.

According to embodiments of the subject matter described herein, the computation of the NCRS for the new concepts by aggregating all intermediate values includes computing the new concept relatedness score NCRSj for the new concept as a sum of all intermediate values computed for the new concept NCj according to: $NCRSj = \Sigma_{p=1}^{tc} IM_{jp}$. Thereby, the summation limit "tc" is the total number of new and reference concepts in the extended co-occurrence matrix, and summation variable "p" is an integer in the depicted range (e.g., of 1 to tc).

According to embodiments of the subject matter described herein, the penalty factor PF is one ("1") if the new concept for which the NCRS is computed co-occurs at least once with one of the reference concepts in at least one of the test documents. The penalty factor PF is larger than one (1) (e.g., two ("2")) if the new concept for which the NCRS is computed does not co-occur at least once with one of the reference concepts in at least one of the test documents, but occurs with another new concept that co-occurs with a reference concept at least once in the test documents (e.g., where the other new concept co-occurs at least once with one of the reference concepts in at least one of the test documents). Thus, a penalty factor PF larger than one (1) is used for computing NCRS scores for indirect co-occurrences, also referred herein as "second level co-occurrences."

These features may be advantageous as the intermediate values for pairs of two new concepts differ from (and are lower than) intermediate values computed for pairs of a new concept and a reference concept. This accurately models the "level of co-occurrence" of two different concepts: if a new concept in one or more of the test documents was observed to co-occur with a reference concept, a "first level of co-occurrence" is represented by a penalty factor of one ("1"), which in fact does not have a diminishing effect on the intermediate value. If a new concept in one or more of the test documents was observed to co-occur with another new concept (i.e., a concept that does not occur in at least one of the reference documents and thus per definition is a new concept), a "second level of co-occurrence" is detected and is represented by a penalty factor that is larger than one (1) (e.g., two ("2")). For second-level co-occurrences, the penalty factor has a diminishing effect on the intermediate value. The test documents may be selected by a routine that searches for occurrences of at least one of the reference concepts, so co-occurrences of new concepts and reference concepts may be observed frequently. The observation of a second-level co-occurrence of new concepts is also an indication of semantic relatedness, but the indication is weaker/less reliable than a first-level co-occurrence of a new and a reference concept. By using a penalty factor whose weight depends on the level of the observed co-occurrence, different degrees of semantic relatedness of concepts and documents may be modeled in an accurate manner, and may thereby improve computational processing speed and performance.

According to embodiments of the subject matter described herein, all or the majority of the reference documents may relate to one or more reference topics. Some of the test documents may relate to the one or more reference topics and other test documents may not relate to the one or more reference topics. Thus, the set of test documents may include a mixture of documents that may be completely or partially related to one or more of the reference topics, and may include some documents that do not relate to the reference topics (e.g. because they are off-topic postings). Thus, a fraction of the documents not relating to the one or more reference topics is higher in the set of test documents than in the set of reference documents.

For example, the reference documents may be Facebook® postings of a moderated fan page of a prominent figure, event, or institution; and the test documents may be Facebook® postings of user accounts that mention the name of the prominent figure, event, or location/institution, or that have some other connection to the reference documents (e.g. are Twitter® or Facebook® postings of users having the same age, home town, professional occupation, etc.).

According to embodiments of the subject matter described herein, a processing flow of the technology described herein further includes generating the set of reference documents by automatically and/or semi-automatically removing or filtering out test documents that are semantically unrelated to one or more reference topics.

According to embodiments of the subject matter described herein, a processing flow of the extraction of a non-redundant set of reference or test concepts may include:
  applying a word detection routine for identifying individual words in the reference documents or test documents; for example, dictionary-based approaches for a named entity recognition in the reference documents and test documents may be performed; in addition, or alternatively, rule-based or machine-learning based text mining approaches may be used for automatically identifying the occurrence of a particular word or word type in a text; for example, a sequence of an automated sentence detection algorithm, an automated part-of-speech (POS) tagger and a syntax parser may be applied for identifying and tagging individual sentences and words; then, individual words optionally including one or more tags (e.g. POS tags) may be extracted;
  removing stop-words from the totality of identified words; the stop-words being frequently occurring words with general meaning that are known not to correlate with particular topics; for example, words like "the," "a," "when," "but," "although," or the like may be ignored as they typically occur in any kind of text;
  applying a word stemming routine for determining word stems of the words, where different words having the same word stem are interpreted as occurrences of the same semantic concept; for example, the singular and plural forms like "game" and "games" may be identified as two occurrences of the same semantic concept; likewise, different nominalizations of the same word stem like "play" and "player," or different cases of the same word (e.g., "genitive" and "accusative," where each word relates to noun/pronoun relationships) may be identified as occurrences of the same semantic concept; likewise, active and passive forms of a verb may be identified as two occurrences of the same semantic concept;
  in addition, or alternatively, a synonym analysis may be applied for determining different words having the same meaning, whereby synonym words are interpreted as occurrences of the same concept. For example, the terms "famous," "renowned," and "popular" may be identified as synonyms, and may be interpreted as occurrences of the same concept.

These features may be advantageous as they help to identify concepts at a layer of processing that is disassociated from different language styles of different users, and may thus more clearly identify the semantic relatedness of documents (which ideally should not depend on the grammar or the language style used by different persons, but on the topics/concepts discussed in the documents). Moreover, the total number of reference and new concepts is reduced, which may improve computational performance. The non-redundant set of reference concepts and the non-redundant set of new concepts may be generated by applying one or more of the above described stemming techniques for identifying different words which nevertheless represent the same concept.

According to embodiments of the subject matter described herein, a processing flow may include identifying the test documents by automatically identifying all documents in a super-set of documents that include at least one occurrence of at least one of the reference concepts.

According to embodiments of the subject matter described herein, a processing flow may include:
  automatically or manually specifying a DSS threshold value; for example, a user or a program logic may choose a particular threshold value in dependence on a current use case scenario: if the most important goal is to identify and filter out every off-topic document and the risk of erroneously filtering out a relevant topic is considered acceptable, a comparatively low ("strict") threshold value may be selected; alternatively, if the most important goal is to avoid erroneously filtering out a relevant topic and the existence of some off-topic documents is considered acceptable, a comparatively high ("permissive") threshold value may be selected;
  comparing the DSS of each of the test documents with the DSS threshold value; and
  identifying each document whose DSS is below the DSS threshold value as an off-topic document that is unrelated to the set of reference concepts.

According to embodiments of the subject matter described herein, the reference documents may be user postings of a first social media application, a first messenger application, or a first chat application hosted by the one or more social networking platform servers. The test documents may be user postings of a second social media application, a second messenger application, or a second chat application hosted by the one or more social networking platform servers. Preferentially, the reference documents may be derived from a data source considered to be of a higher quality than the test documents (e.g. because the social media platform providing the reference documents is moderated, while the social media platform providing the test documents is not moderated).

According to embodiments of the subject matter described herein, each test document has a length of less than 400 characters. For example, the test documents may be Twitter® postings (tweets) having a maximum length of 140 characters.

According to embodiments of the subject matter described herein, the set of reference documents may include Facebook® postings (moderated social network postings of a first social networking service hosted by the one or more social networking platform servers), and the set of test documents consists of Twitter® postings (unmoderated second social network postings of a second social networking service hosted by the one or more social networking platform servers).

A "concept" as used herein is a text "semantic entity," i.e., a text-based instance of an idea representing the fundamental characteristics of what topic it represents. A concept may have many different physical representations, such as character strings that are contained in an electronic text document and that are stored in a volatile or non-volatile storage device of a computer system. A set of "non-redundant concepts" is a set of concepts that respectively abstract away syntactical variants, spelling variants, singular plural forms, synonym expressions, and so on. Thus, in a set of non-redundant concepts, multiple different synonyms of a particular idea, or singular and plural forms of a word describing the idea, are all represented as a single concept and a corresponding text data object.

A "document" as used herein is an electronic document, e.g. a set of symbols, e.g. alphanumeric symbols, stored in a volatile or non-volatile storage device of a computer system. A document may be, for example, a text file or a posting in a social media platform, chat room, etc.

A "reference document" as used herein is a document derived from a particular document source. For example, the reference document source may be known to include documents related to a particular topic or to a set of semantically related topics. The topics of interest are also referred to as "reference concepts." Preferentially, the reference documents include no or only a small number of off-topic documents that are not related or that are only weakly related to the topics of interest.

A "test document" as used herein is a document derived from a different document source. For example, the test document source may be known or suspected to include noisy data, i.e., documents not related to the topics of interest (the "reference concepts"). For example, the test document source may be an un-moderated social media platform.

A "reference concept" as used herein is a concept known to be semantically related to one or more topics of interest, e.g. because the reference concepts occur in reference documents known or strongly suspected to reliably relate to the topics of interest.

A "test concept" as used herein is any concept automatically identified in a test document. For example, a text mining application may include a dictionary of "interesting concepts" and corresponding words, e.g. known first names and second names of persons, names of animals, persons, buildings, job occupations, or may use patterns for identifying interesting concepts in natural language text test documents. The concepts are referred to as "test concepts" if they were detected in a test document. In case a test concept was observed to occur also in at least one of the reference documents, it is referred to as "reference concept" occurring in a test document. In case a test concept was observed not to occur in any of the reference documents, the concept is referred to as "new concept."

The expression "text mining" or "natural language processing" as used herein is the process of turning unstructured text into structured data.

A "social media platform" and a "social networking service" as used interchangeably herein are networked computer-mediated technologies that allow individuals, companies, and other organizations to view, create and share information, ideas, career interests, and other forms of expression via virtual communities and networks. A social media platform typically includes an application interface for a set of interactive Web 2.0 Internet-based applications, that support generation and posting of user-generated content such as text posts or comments, digital photos or videos, as well as data generated through all online interactions, and routines and user-selectable options to develop online social networks by connecting a user's profile with those of other individuals and/or groups. Typically, social media platforms operate in a dialogic transmission system (many sources to many receivers). This is in contrast to traditional media that operates under a monologic transmission model (one source to many receivers).

In the following, technology for identifying the semantic similarity of a particular test document, e.g. a Twitter® posting, to a set of reference documents, e.g. Facebook® postings, will be described by making reference to the flow chart of FIG. 10, described further below. Test documents having a very low document similarity score (DSS) are identified as unrelated off-topic postings. Such postings may be automatically filtered out and deleted or may be marked for manual inspection by an operator.

The automated detection of semantically similar or dissimilar documents may be performed, for example, on an automated text mining and semantic relatedness device implemented using a computer system, a server system, or a distributed computer system, e.g. a cloud computer system. The computer system may include one or more processors and may host a text mining application configured to perform the steps described herein. The text mining application may be a standalone software application or a client application of one or more remote social media platforms. The text mining application may likewise be a program routine or module that is an integral part of another program, e.g. of a social media platform or of a plug-in of the social media platform.

FIG. 1 depicts the extraction of a non-redundant list 106 of reference concepts from reference documents, from a first social networking service (SocialNetwork_1), such as Facebook®. For example, three postings F1, F2 and F3 may represent three reference documents constituting a set 102 of reference documents. The set of reference postings may be, for example, the totality or a sub-set of Facebook® postings of the Facebook® page of an event "Summer Camp" in Krakow 2016. It is assumed that the Facebook® page is moderated by one or more operators and mainly includes postings that are related to the event. Facebook® posts are created by organizer and comments are moderated. In view of the moderation and close association with postings to the event, the posted data may be considered reliable and may be used as a pattern. Different social media services may be used as well, provided they are moderated or that they include some other means for ensuring that the majority of postings is related to a particular topic.

For example, the reference documents 102 may be retrieved through the Facebook® API from Facebook® by a client text mining application.

In a first step, occurrences of a set 104 of concepts referred herein as "reference concepts" C1-C5 are identified in the reference documents. The list of reference concept occurrences may be redundant, in that C1 "campers" and C4 "camper" represent singular/plural forms of the same semantic concept. By applying a stemming operation and optionally one or more further text processing operations (e.g. for identifying synonyms, passive/active versions of the same assertion), a set 106 of non-redundant concepts is created that is preferentially free of duplicate strings representing the same semantic concept (i.e., is free of strings basically having the same meaning that may differ in syntax, such as representing singular/plural or differing in respect to tense, case, or the like). Applying this stemming operation, element 106 item GC1 shows that a single grouped reference concept "campers" (plural) is utilized to represent both singular and plural similar variants of this concept, where C1 "campers" and C4 "camper" are both represented with the single grouped concept GC1 (e.g., "C1+C4" in the drawing). This illustration of a same semantic concept will be utilized and described below with respect to identifying and documenting co-occurrence of semantic concepts.

FIG. 2 depicts a co-occurrence matrix 202 computed for the reference concepts. The co-occurrence matrix 202 indicates how often a particular pair of concepts co-occurs together in a reference document F1-F3. Co-occurrences of pairs of concepts are termed "grouped concepts" (GCs) herein (alternatively, termed "grouped reference concepts" or "grouped test concepts"). For example, GC1 ("campers"—again as a composite/combined grouped reference concept of concept C1 and concept C4 for both singular and plural versions of the same concept as described above) and GC2 ("Summer Camp") occur together in two reference documents (e.g., F1 and F2), and thus have a co-occurrence number of two (2). Specifically, the plural term "campers" co-occurs with "Summer Camp" in F1, while the singular term "camper" co-occurs with "Summer Camp" in F2, resulting in a co-occurrence for GC1 and GC2 of two (2). As each concept inevitably co-occurs with itself, the diagonal cells may be assigned the value of zero ("0"). The co-occurrence matrix 202 derived from the reference documents may be considered a "training set," as this matrix may be used for computing reference co-occurrence frequencies (RCCF) indicating how often a particular concept is expected to co-occur with other (reference) concepts in a curated, high-quality document set.

FIG. 3 depicts the extraction of test concepts from test documents. FIG. 3 extends the identified grouped concepts described above in association with FIG. 2. In a further step, a set 302 of test documents is retrieved. The test documents typically have a lower quality than the reference documents, such as because they are not moderated, and do not include other means for filtering out or blocking automated "bot-generated" postings or other forms of data "noise." For example, data matching keywords/tags related to the event from a second social networking service (SocialNetwork_2), such as Twitter®, may be used as test documents. For example, Twitter® postings T1-T5 of various users posted, using as hash tags one of the reference concepts, may be retrieved by a text mining application via a Twitter® API. The square and circle shaped symbols show that some tweets (e.g., T1 and T3) relate to the relevant topic/hash tag "Campville2016," while others do not (e.g., T2: "What a great day to join a gym," T4: "We opened a new bookstore—visit us," and T5: "Find the right car").

Then, a text mining algorithm, e.g. a dictionary based named entity recognition procedure, may be applied on the test documents to identify concepts. By applying stemming, synonym resolution, and other text mining sub-routines as described for the reference concepts, a non-redundant set 306 of reference concepts that also occur in the test documents and new test concepts identified in the test documents may be extracted from the test documents. Some of the extracted test concepts are also reference concepts, i.e., concepts that are mentioned at least once in at least one of the reference documents. For example, the test concept "campers" GC1 is a reference concept. Other test concepts, such as GC2 "Summer Camp" does not occur in the test documents, and is omitted from the non-redundant set 306. Similarly, GC5 "a gym" does not occur in any one of the reference documents, but is included in the non-redundant set 306 as these types of concepts are referred to as "new concepts" because they are identified for the first time in the test documents.

FIG. 4 depicts a co-occurrence matrix 402 computed for the test concepts and the reference concepts that also occur in the test documents. The co-occurrence matrix 402 indicates how often a particular pair of concepts co-occurs together in a test document T1-T5. For example, GC3 ("Campville2016") and GC6 ("camping experience") occur together in test document T3 and thus have a co-occurrence number of 1. As each concept inevitably co-occurs with itself, the diagonal cells may be assigned the value of zero ("0"). The co-occurrence matrix 402 derived from the test documents may be considered a "core element" of a "test data set," as this matrix will be extended and the extended matrix may be used for computing scores indicating a computed, expected frequency of co-occurrence with other (test) concepts in the test document set.

Of course, the examples given in FIGS. 1-4 relate to very small numbers of reference and test documents. Typically, much larger document sets may be extracted and, accordingly, much larger co-occurrence matrices extracted from larger reference and test documents sets may be created that include more "realistic" numbers (e.g., thousands, tens of thousands, hundreds of thousands, etc.).

According to embodiments of the subject matter described herein, the processing described herein may include normalizing the reference co-occurrence matrix 202 and the test co-occurrence matrix 402 to the same range, such as to a range between zero (0) and one hundred (100).

FIGS. 5a and 5b depict the co-occurrence matrices 202 and 402, that respectively represent the reference and test matrices after these matrices have been normalized to a value range of zero to one hundred (0-100). Applying a normalization step may be advantageous as different set sizes of the reference document set and the test document set are leveled out.

FIG. 6 depicts the co-occurrence matrix of FIG. 5a which in addition include, for each reference concept, a computed reference co-occurrence frequency (RCCF) value within a last vertical column on the right of the co-occurrence matrix 402. Each RCCF value is computed by summing up occurrence numbers of a particular row.

For example, the RCCF value of the concept GC1 (first row) is two hundred and thirteen (e.g., 0+100+98+15=213). The RCCF value of the concept GC2 (second row) is two hundred and nine (e.g., 100+0+99+10=209), while the RCCF value of the concept GC3 (third row) is one hundred ninety seven (e.g., 98+99=197), and the RCCF value of the concept GC4 (fourth row) is twenty five (e.g., 15+10=25). In more generic terms, RCCF(GCi)=GCi1+GCi2+ . . . +GCnr, where nr is the total number of reference concepts in the non-redundant set of reference concepts identified in the reference documents. In the depicted example, nr is 4 (and corresponds to the four columns GC1-GC4 of the co-occurrence matrix 402). FIG. 6 also shows that an average RCCF (AVGRCCF) of the first social network has been calculated as one hundred and sixty one (161).

In a further step, an extended co-occurrence matrix is generated from the reference and the test co-occurrence matrices.

FIG. 7 shows an extended co-occurrence matrix 702 that may be generated from the reference co-occurrence matrix 202 and from the test co-occurrence matrix 402. The matrix 702 may be generated such that a totality of columns (and rows) represent the totality of reference concepts identified in the reference documents and new concepts identified in the test documents. In other words, the extended co-occurrence matrix may be created from the test co-occurrence matrix 402 by adding columns and lines for those reference concepts that were not identified in any of the test documents (see column for reference concept GC2 that, as described above, was not found in the test documents). Further, a region 704 represents new concepts correlated with baseline concepts initially derived from the reference documents (e.g., GC1 through GC4).

FIG. 8 shows that the extended co-occurrence matrix may include a further column 802 for storing co-occurrence frequency values. The extended co-occurrence matrix may include, for each of the reference and new concepts, the number of occurrences in the totality of test documents. It is possible that a reference concept was never observed in any of the test documents (see e.g. GC2). The area 702 shows cells that correspond to cells of the reference co-occurrence matrix (but that include occurrences observed in the test documents, not in the reference documents).

FIG. 8 further shows that for each of the reference concepts, the RCCF value (that has already been computed based on the reference co-occurrence matrix) may be used as a co-occurrence frequency CCF value. The RCCF values may be stored in a respective column 802. The RCCF values of the reference concepts are not re-computed based on the observed occurrences in the (low quality) test documents. Only for the new concepts (lines 5-8/new concepts GC5-GC8), a "new concept relatedness score" (NCRS) is shown to have been computed, which represents a "reliability index" for the new grouped concepts (again, GC5-GC8). The NCRS of a new concept is indicative of the relatedness of the new concepts with the totality of reference concepts extracted from the reference documents.

For each of the new concepts GC5-GCB, the corresponding NCRS5, NCRS6, NCRS7, NCRS8 may be calculated as follows:

At first, the average AVGRCCF of all RCCFs may be computed for the totality of reference concepts identified in the reference documents according to $$AVGRCCF = \frac{\sum_{z=1}^{nr} RCCF_z}{nr}.$$

Again, this is depicted within FIG. 6, as introduced above. The parameter nr represents the total number of reference concepts in the non-redundant set of reference documents and the "running number" z is an integer in the range of one (1) to nr. For example, AVGRCCF of the example depicted in FIG. 6 is computed according to $$AVGRCCF = \frac{213 + 209 + 197 + 25}{nr = 4} = 161,$$

again as introduced above.

Then, the NCRS values may be computed in a two-step procedure: at first, the NCRS values may be computed for all new concepts co-occurring at least once with a reference concept in the test documents. This may be advantageous as the RCCF values already known for the reference concepts may be used for assessing the relatedness of the new concepts directly co-occurring with the reference concepts in the test documents. Then, after having computed the NCRS values for the new concepts belonging to the "first level of co-occurrence," the NCRS value for all other new concepts may be computed for those new concepts that do not co-occur directly with a reference concept in a test document but that co-occur with one of the new concepts for which an NCRS value was already computed. The new concepts are also referred to as concepts belonging to the "second level of co-occurrence." New concepts that do not co-occur with any new concept of the "first level of co-occurrence" may be referred to as new concepts of the "third level of co-occurrence," and may be automatically assigned an NCRS value of "0" (see e.g., GC7 of matrix 702').

For each new concept NCj, j being an integer in the range of one (1) to the total number of non-redundant new concepts identified in the test documents as co-occurring at least once with a reference concept, all possible pairs of the new concept NCj with a reference concept OCp (also referred to as "other concept") in the extended co-occurrence matrix may be identified and analyzed for computing intermediate values that are summed up as the new NCRSj of NCj. The running number p is an integer between one (1) and the total number of reference concepts occurring at least once in at least one of the test documents (e.g., 4 in the depicted example matrix 702).

For each of the pairs NCj-OCp, the text mining software computes an intermediate value IMjp according to:

$$IMjp = \frac{\#[NCj - OCp] * RCCFp}{AVGRCCF * PF},$$

where #[NCj-OCp] is the number of co-occurrences of the concept pair NCj-OCp in the extended co-occurrence matrix, RCCFp is the RCCF value computed for the other concept from the reference documents, and PF is a penalty factor.

The penalty factor is one ("1") or a number larger than one (1), and depends on the "level of co-occurrence," meaning it depends on the question of whether the new concept for which the NCRS score is to be computed co-occurs at least once with a reference concept in the test documents.

After having computed the intermediate values IMjp for the currently evaluated new concept NCj and all possible other concepts OCp (except NCj itself), the new concept relatedness score NCRSj for the new concept NCj may be computed by aggregating all intermediate values IMjp computed for the new concept NCj.

After having computed all NCRS scores for the new concepts belonging to the first level of co-occurrence (see example 1 further below for concept pair GC4-GC5), all NCRS scores are computed for the new concepts belonging to the second level of co-occurrence; i.e., for new concepts not directly co-occurring with a reference concept, but co-occurring with a new concept that co-occurs with a reference concept (see example 2 further below for concept pairs GC6-GC8). All new concepts that belong to the third level of co-occurrence; i.e., that do not co-occur with any reference concept or with a new concept of the second level of co-occurrence, may be assigned the NCRS value zero ("0") (see GC7).

Example 1: Computing NCRS5 for the New Concept GC5

Observations: AVGRCCF=161; occurrence number (of GC5 with GC4) #[NCj-OCp]]=5; RCCFp=RCCF(GC4)=25, which can be derived from the reference co-occurrence matrix; PF="1" as GC4 is a reference concept (in other words: the new concept GC5 for which the NCRS is to be computed co-occurs with a reference concept GC4 for which an RCCF score already exists in the form of RCCF4 computed from the reference documents).

At first, an intermediate value IM54 for the pair GC5-GC4 is computed according to:

$$IM(GC5 - GC4) = \frac{\#[NCj - OCp] * RCCFp}{AVGRCCF * PF} = \frac{5*25}{161*1} = \frac{125}{161} = 0.7739$$

Then, further intermediate values IM5$p$ for all pairs GC5-GCp are computed. In the present example, there does not exist a further concept that co-occurs with the new concept GC5 at least once. Thus, the intermediate values for the concept pairs GC5-GC1, GC5-GC2, GC5-GC3 are zero ("0"), respectively. The pair GC5-GC5 is assigned the value zero ("0") by default. The pairs GC5-GC6, GC5-GC7, GC5-GC8 are ignored as GC6-GC8 are new concepts.

Thus, the new concept relatedness score NCRS(GC5) for the new concept GC5 is computed by aggregating, e g summing up, all intermediate values IMjp computed for the new concept GC5: NCRS(GC5)=SUM (IM$_{GC5GC1}$+IM$_{GC5GC2}$+IM$_{GC5GC3}$+IM$_{GC5GC4}$)=(0+0+0+0.7739)=0.7739.

Analogously, the new concept relatedness score NCRS (GC6) for the new concept GC6 is computed by aggregating, e g summing up, all intermediate values IMjp computed for the new concept $$GC6: NCRS(GC6) =$$
$$SUM(IM_{GC6GC1} + IM_{GC6GC2} + IM_{GC6GC3} + IM_{GC6GC4}) =$$
$$\left(0 + 0 + \frac{20*197}{161*1} + 0\right) = 24.47204969.$$

Example 2: Computing NCRS8 for the New Concept GC8

The NCRS values for new concepts belonging to the second level of co-occurrence may be computed as follows: for each pair of the new concept NCk (for k=8) and one other new concept NCj, the other concept being a new concept for which a new concept relatedness score NCRSj was already computed, an intermediate value IMkj may be computed according to:

$$IMkj = \frac{\#[NCk - NCj] * NCRSj}{AVGRCCF * PF},$$

where #[NCk-NCj] is the number of co-occurrences of the concept pair NCk-NCj in the extended co-occurrence matrix, PF is a penalty factor larger than one, and NCRSj is the NCRS value computed already for the new concept NCj.

Observations: AVGRCCF=161; occurrence number (of GC8 with GC6) #[NCj-OCp]]=35; NCRSj=24.47204969; PF="2" as GC8 is a new concept and there does not exist at least one co-occurring reference concept in the test documents together with GC8.

An intermediate value IM86 for the pair GC8-GC6 is computed according to:

$$IM(GC8 - GC6) =$$
$$\frac{\#[NC8 - OC6] * NCRS6}{AVGRCCF * PF} = \frac{35 * 24.47204969}{161 * 2} = 2.660005401$$

FIG. 9 depicts test documents and their respective document similarity score (DSS). The DSS may be computed as an aggregate, e.g. as a sum, of the RCCF scores of all reference concepts contained in the document and of the NCRS scores of all new concepts contained in the document. For example, for the test document (Twitter® tweet) T, the DSS is computed by summing up the RCCF score computed for the reference concept GC1 "camper" (213) and the RCCF score computed for the reference concept GC3 "#Campville 2016" (197) as 213+197=410.

The DSS for tweet T2 is computed by summing up the RCCF score computed for the reference concept GC4 "great day" (25) and the NCRS computed for the new concept GC5 "gym" (0.776397516) as 25+0.776397516=25.776397516.

The DSS for tweet T3 is computed by summing up the RCCF score computed for the reference concept GC3 "#Campville2016" (197) and the NCRS computed for the new concept GC6 "camping experience" (24,472) as =221, 472. As may be inferred from the total DSS scores of the tweets T1-T5, Campville's related tweets may be correctly identified by a high DSS and the test documents may be ordered in accordance to their semantic relatedness to the "Campville": T1, T3, T5, T2, and T4. T4, which is completely unrelated to the Campville event, has value 0. T5, which introduces two new concepts (and is correct), has slightly higher value that T2 (incorrect), although T2 contains a reference concept. By comparing the DSSs of the test documents with a predefined threshold, the text mining application may automatically identify and optionally mark, block and/or remove test documents having a low DSS value as an "off-topic" posting or data noise. This may provide significant advantages within social networks as the resulting data of an increasingly large (big) set of data further increases, to allow removal of these types of "off-topic" posting or data noise.

FIG. 10 is a flow chart of a method for identifying semantic similarity between documents. The method can be executed by one or more processors of a computer system hosting a text mining program. In a first step 902, the text mining program extracts a set of non-redundant reference concepts from a set of reference documents. The reference documents are preferably social media postings of a moderated, high quality social media platform. For each of the reference concepts, the text mining application computes a reference co-occurrence frequency value RCCF in step 904. In addition, the text mining application extracts test concepts from test concepts in step 906. The test concepts are a mixture of reference concepts and new concepts. The test documents are preferably social media postings of a non-moderated social media plat form comprising a significant number of off-topic, e.g. bot generated postings. In step 908, the text mining application computes an extended co-occurrence matrix, which is basically a co-occurrence matrix of the test documents supplemented by additional rows and columns for reference concepts not detected in any of the test documents. For each of the new concept, the text mining application computes a new concept relatedness score RCNCRS in step 910. In order to assess the semantic relatedness of a particular test document to the totality of reference concepts mentioned in the set of reference documents, the text mining application in step 912 sums up the RCCFs computed for the reference concepts mentioned in this document and the NCRS computed for the new concepts mentioned in this document and compares the computed sum, which is also referred to as "DSS" value, with a threshold value. If the DSS is below the threshold, the document is considered to be a semantically unrelated "off topic" posting and is removed.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
by a text mining server that autonomously determines semantic relatedness of a plurality of semantic concepts:
establishing a network connection to one or more social networking platform servers;
identifying, by programmatically navigating at least one application programming interface (API) of at least one social networking application hosted by the one or more social networking platform servers, multiple reference documents and multiple test documents published by the one or more social networking platform servers;
applying a first text mining analysis on the reference documents and extracting a non-redundant set of reference concepts from the reference documents;
for each reference concept of the set of reference concepts, computing a reference co-occurrence frequency (RCCF), the RCCF indicating the frequency of co-occurrence of the reference concept with all other reference concepts within the reference documents;
applying a second text mining analysis on the test documents and extracting a non-redundant set of test concepts, the test concepts comprising one or more new concepts that are not elements of the set of reference concepts and the test concepts comprising one or more of the reference concepts;
computing an extended co-occurrence matrix indicating the frequency of co-occurrence of each new concept and each reference concept with all other new concepts and reference concepts within the test documents;
for each of the new concepts, computing a new concept relatedness score (NCRS) as a function of the co-occurrences of the new concept in the extended co-occurrence matrix, the NCRS representing the semantic relatedness of the new concept to a totality of the reference concepts;
for each of the test documents, computing a document similarity score (DSS) by aggregating the NCRS of each new concept and the RCCF of each reference concept contained in the test document, the DSS representing the semantic relatedness of the test document to the totality of the reference concepts;

automatically identifying any of the test documents with a computed DSS below a DSS threshold value; and
one or more of marking, blocking and removing any identified test documents with the computed DSS below the DSS threshold value.

2. The computer-implemented method of claim 1, where computing the RCCFs for the set of reference concepts comprises, for each reference concept (RCi):
counting a number of co-occurrences (#coocc) RCi-RCj of the reference concept RCi with each other one reference concept RCj of the non-redundant set of reference concepts within the reference documents; and
computing a reference co-occurrence frequency (RCCFi) of the reference concept RCi as a sum of all counted co-occurrences according to $$RCCFi = \sum_{j=1}^{nr} (\#coocc(RCi - RCj)),$$

where nr is a number of reference concepts in the non-redundant set of reference concepts and #coocc(RCi-RCj) is the number of co-occurrences of the reference concept RCi and the reference concept RCj observed in the reference documents, j being an integer in a range of 1 to nr.

3. The computer-implemented method of claim 1, where computing the NCRS for the new concepts comprises:
computing an average co-occurrence frequency (AVGRCCF) of all RCCFs computed for the reference concepts according to $$AVGRCCF = \frac{\sum_{z=1}^{nr} RCCF_z}{nr},$$

nr being a total number of reference concepts in a non-redundant set of reference documents, z being an integer in a range of 1 to nr; and
for each new concept NCj co-occurring at least once with at least one of the reference concepts in at least one of the test documents:
for each pair of the new concept NCj and one other concept OCp, the other concept being a reference concept occurring at least once in at least one of the test documents: computing an intermediate value IMjp according to:

$$IMjp = \frac{\#[NCj - OCp] * RCCFp}{AVGRCCF * PF},$$

where #[NCj-OCp] is a number of co-occurrences of the concept pair NCj-OCp in the extended co-occurrence matrix, PF being a penalty factor, the penalty factor being one (1) or a number larger than one (1), RCCFp being an RCCF value computed for the other concept OCp from the reference documents; and
computing the new concept relatedness score NCRSj for the new concept NCj by aggregating all intermediate values IMjp computed for the new concept NCj.

4. The computer-implemented method of claim 3, where computing the NCRSj for the new concept NCj by aggregating all intermediate values IMjp comprises:

computing the new concept relatedness score NCRSj for the new concept NCj as a sum of all intermediate values IMjp computed for the new concept NCj according to $NCRSj = \Sigma_{p=1}^{tc} IMj_p$, tc being a total number of new concepts and reference concepts in the extended co-occurrence matrix, p being an integer in a range of 1 to tc.

5. The computer-implemented method of claim 3, where computing the NCRSj for the new concept NCj further comprises, after having computed NCRSs for all new concepts occurring at least once with at least one of the reference concepts in at least one of the test documents:

for each new concept NCk co-occurring solely with other new concepts in the test documents:
for each pair of the new concept NCk and one other new concept NCj, the other concept being a new concept for which a new concept relatedness score NCRSj was already computed: computing an intermediate value IMkj according to:

$$IMkj = \frac{\#[NCk - NCj] * NCRSj}{AVGRCCF * PF},$$

where #[NCk-NCj] is a number of co-occurrences of the new concept pair NCk-NCj in the extended co-occurrence matrix, PF being a penalty factor, the penalty factor being one (1) or a number larger than one (1), and NCRSj being the NCRS value computed already for the new concept NCj; and computing a concept relatedness score NCRSk for the new concept NCk by aggregating all intermediate values IMkj computed for the new concept NCk.

6. The computer-implemented method of claim 3, where:
the penalty factor PF is one (1) if the new concept for which the NCRS is computed co-occurs at least once with one of the reference concepts in at least one of the test documents; and
the penalty factor PF is larger than one (1) if the new concept for which the NCRS is computed does not co-occur at least once with one of the reference concepts in at least one of the test documents but occurs with another new concept that co-occurs at least once with one of the reference concepts in at least one of the test documents.

7. The computer-implemented method of claim 6, where the penalty factor PF is two (2) for computing an intermediate value for a pair of the new concepts.

8. The computer-implemented method of claim 1, where:
all or a majority of the reference documents relate to one or more reference topics, some of the test documents relating to the one or more reference topics and other test documents not relating to the one or more reference topics; and
a fraction of the test documents not relating to the one or more reference topics is higher in the test documents than in the reference documents.

9. The computer-implemented method of claim 1, further comprising:
generating the reference documents by one of automatically or semi-automatically removing or filtering out test documents that are semantically unrelated to one or more reference topics.

10. The computer-implemented method of claim 1, where extracting the non-redundant set of reference concepts or the non-redundant set of test concepts comprises one of:

applying a word detection routine for identifying individual words in the reference documents or the test documents;

removing stop-words from a totality of identified words, the stop-words being frequently occurring words with general meaning that are known not to correlate with particular topics;

applying a word stemming routine for determining word stems of the identified words, where different words having a same word stem are interpreted as occurrences of a same semantic concept; or applying a synonym analysis for determining different words having a same meaning, where synonym words are interpreted as occurrences of the same semantic concept.

11. The computer-implemented method of claim 1, further comprising:
identifying the test documents by automatically identifying all documents in a super-set of documents that comprise at least one occurrence of at least one of the reference concepts.

12. The computer-implemented method of claim 1, further comprising:
automatically specifying the DSS threshold value;
comparing the computed DSS of each of the test documents with the DSS threshold value; and
where automatically identifying any of the test documents with the computed DSS below the DSS threshold value comprises identifying each document whose computed DSS is below the DSS threshold value as an off-topic document that is unrelated to the set of reference concepts.

13. The computer-implemented method of claim 1, where:
the reference documents comprise user postings of a first social networking application, a first messenger application, or a first chat application hosted by the one or more social networking platform servers; and
the test documents comprise user postings of a second social networking application, a second messenger application, or a second chat application hosted by the one or more social networking platform servers.

14. The computer-implemented method of claim 1, where each test document comprises a length of less than 400 characters.

15. The computer-implemented method of claim 1, where the reference documents comprise moderated social network postings of a first social networking service hosted by the one or more social networking platform servers, and the test documents comprise unmoderated second social network postings of a second social networking service hosted by the one or more social networking platform servers.

16. A computer program product, comprising:
a computer readable storage medium having computer readable program code embodied therewith, where the computer readable storage medium is not a transitory signal per se and where the computer readable program code when executed on a computer, as part of a text mining server that autonomously determines semantic relatedness of a plurality of semantic concepts, causes the computer to:
establish a network connection to one or more social networking platform servers;

identify, by programmatically navigating at least one application programming interface (API) of at least one social networking application hosted by the one or more social networking platform servers, multiple reference documents and multiple test documents published by the one or more social networking platform servers;

apply a first text mining analysis on the reference documents and extract a non-redundant set of reference concepts from the reference documents;

for each reference concept of the set of reference concepts, compute a reference co-occurrence frequency (RCCF), the RCCF indicating the frequency of co-occurrence of the reference concept with all other reference concepts within the reference documents;

apply a second text mining analysis on the test documents and extract a non-redundant set of test concepts, the test concepts comprising one or more new concepts that are not elements of the set of reference concepts and the test concepts comprising one or more of the reference concepts;

compute an extended co-occurrence matrix indicating the frequency of co-occurrence of each new concept and each reference concept with all other new concepts and reference concepts within the test documents;

for each of the new concepts, compute a new concept relatedness score (NCRS) as a function of the co-occurrences of the new concept in the extended co-occurrence matrix, the NCRS representing the semantic relatedness of the new concept to a totality of the reference concepts;

for each of the test documents, compute a document similarity score (DSS) by aggregating the NCRS of each new concept and the RCCF of each reference concept contained in the test document, the DSS representing the semantic relatedness of the test document to the totality of the reference concepts;

automatically identify any of the test documents with a computed DSS below a DSS threshold value; and one or more of mark, block and remove any identified test documents with the computed DSS below the DSS threshold value.

17. A computer system, comprising:

a memory that stores reference documents and test documents; and a processor of a text mining server that autonomously determines semantic relatedness of a plurality of semantic concepts, the processor being programmed to:

establish a network connection to one or more social networking platform servers;

identify, by programmatically navigating at least one application programming interface (API) of at least one social networking application hosted by the one or more social networking platform servers, multiple reference documents and multiple test documents published by the one or more social networking platform servers;

apply a first text mining analysis on the reference documents and extract a non-redundant set of reference concepts from the reference documents;

for each reference concept of the set of reference concepts, compute a reference co-occurrence frequency (RCCF), the RCCF indicating the frequency of co-occurrence of the reference concept with all other reference concepts within the reference documents;

apply a second text mining analysis on the test documents and extract a non-redundant set of test concepts, the test concepts comprising one or more new concepts that are not elements of the set of reference concepts and the test concepts comprising one or more of the reference concepts;

compute an extended co-occurrence matrix indicating the frequency of co-occurrence of each new concept and each reference concept with all other new concepts and reference concepts within the test documents;

for each of the new concepts, compute a new concept relatedness score (NCRS) as a function of the co-occurrences of the new concept in the extended co-occurrence matrix, the NCRS representing the semantic relatedness of the new concept to a totality of the reference concepts;

for each of the test documents, compute a document similarity score (DSS) by aggregating the NCRS of each new concept and the RCCF of each reference concept contained in the test document, the DSS representing the semantic relatedness of the test document to the totality of the reference concepts;

automatically identify any of the test documents with a computed DSS below a DSS threshold value; and one or more of mark, block and remove any identified test documents with the computed DSS below the DSS threshold value.

* * * * *